(12) United States Patent
Huang (10) Patent No.: US 10,182,530 B1
(45) Date of Patent: Jan. 22, 2019

(54) HANDHELD GARDENING GEAR SHEARS

(71) Applicant: Ho Cheng Garden Tools Co., Ltd., Fuxing Township, Changua County (TW)

(72) Inventor: Yao-Chung Huang, Chang Hua Hsien (TW)

(73) Assignee: Ho Cheng Garden Tools Co., Ltd., Changhua County (TW)

( * ) Notice: Subject to any disclaimer, the term of this patent is extended or adjusted under 35 U.S.C. 154(b) by 3 days.

(21) Appl. No.: 15/656,025

(22) Filed: Jul. 21, 2017

(51) Int. Cl.
*A01G 3/02* (2006.01)

(52) U.S. Cl.
CPC ..................... *A01G 3/021* (2013.01)

(58) Field of Classification Search
CPC .......... A01G 3/021; A01G 3/025; A01G 3/04; A01G 3/02; B25B 7/12; B25B 7/14; B26B 13/26; B26B 13/28
See application file for complete search history.

(56) References Cited

U.S. PATENT DOCUMENTS

| 127,735 | A | * | 6/1872 | Broadbooks | B23D 29/023 30/250 |
|---|---|---|---|---|---|
| 246,399 | A | * | 8/1881 | Layman | B23D 29/023 30/250 |
| 448,363 | A | * | 3/1891 | Perry | A01G 3/02 30/239 |
| 466,879 | A | * | 1/1892 | Dixon | A01G 3/02 30/239 |
| 564,102 | A | * | 7/1896 | Richard | A01G 3/02 30/239 |
| 784,771 | A | * | 3/1905 | Adams | B25B 7/12 81/134 |
| 1,207,947 | A | * | 12/1916 | Litchfield | B25B 7/12 30/181 |
| 1,882,218 | A | * | 10/1932 | Harvey | A01G 3/02 30/233 |
| 1,915,404 | A | * | 6/1933 | Clifton | B25B 7/12 30/188 |
| 2,365,398 | A | * | 12/1944 | Drmic | A01G 3/02 30/258 |
| 2,816,359 | A | * | 12/1957 | Hogue | A01G 3/02 30/239 |
| 4,079,514 | A | * | 3/1978 | Arlett | A01G 3/02 30/261 |

(Continued)

FOREIGN PATENT DOCUMENTS

TW          38194 U      2/2000

*Primary Examiner* — Jonathan Riley
(74) *Attorney, Agent, or Firm* — Alan D. Kamrath; Kamrath IP Lawfirm, P.A.

(57) ABSTRACT

A pair of gardening shears include a first driving arm, a jaw member pivotally connected with the first driving arm, a second driving arm pivotally connected with the first driving arm, a first handle mounted on the first driving arm, a second handle mounted on the second driving arm, and a locking unit mounted on the first handle. Thus, the jaw member is pivotally connected with the first driving arm by the first bolt, and the second driving arm is pivotally connected with the first driving arm by the second bolt, so that the jaw member and the second driving arm have different fulcrums to construct a multi-lever structure so as to perform the cutting action smoothly in an energy-saving way.

6 Claims, 6 Drawing Sheets

(56) References Cited

U.S. PATENT DOCUMENTS

| | | | | |
|---|---|---|---|---|
| 5,689,888 A * | 11/1997 | Linden | B26B 13/26 | 30/192 |
| 5,787,589 A * | 8/1998 | Auderset | A01G 3/02 | 30/261 |
| 5,987,755 A * | 11/1999 | Shih | B26B 13/16 | 30/254 |
| 6,964,099 B1 * | 11/2005 | Zeng | A01G 3/02 | 30/254 |
| 7,178,245 B1 * | 2/2007 | Lee | A01G 3/02 | 30/254 |
| D702,516 S * | 4/2014 | Liu | | D8/5 |
| 9,345,200 B2 * | 5/2016 | Cunningham | A01G 3/0251 | |
| 9,408,350 B1 * | 8/2016 | Wu | A01G 3/021 | |
| 2003/0136008 A1 * | 7/2003 | Lin | A01G 3/0251 | 30/250 |
| 2005/0172499 A1 * | 8/2005 | Huang | A01G 3/02 | 30/250 |
| 2007/0266568 A1 * | 11/2007 | Lin | A01G 3/02 | 30/134 |
| 2008/0016701 A1 * | 1/2008 | Pollock | A01G 3/02 | 30/249 |
| 2008/0115368 A1 * | 5/2008 | Shan | A01G 3/02 | 30/249 |
| 2010/0043238 A1 * | 2/2010 | Linden | A01G 3/02 | 30/251 |
| 2010/0282033 A1 * | 11/2010 | Buchanan | B25B 7/10 | 81/409.5 |
| 2011/0126415 A1 * | 6/2011 | Huang | B26B 13/26 | 30/254 |
| 2011/0192035 A1 * | 8/2011 | Chen | A01G 3/02 | 30/251 |
| 2011/0214293 A1 * | 9/2011 | Huang | A01G 3/02 | 30/251 |
| 2012/0060377 A1 * | 3/2012 | Huang | B26B 13/26 | 30/244 |
| 2012/0137527 A1 * | 6/2012 | Huang | A01G 3/0251 | 30/185 |
| 2012/0198705 A1 * | 8/2012 | Huang | A01G 3/02 | 30/244 |
| 2013/0042486 A1 * | 2/2013 | Lee | A01G 3/02 | 30/249 |
| 2013/0091713 A1 * | 4/2013 | Wu | A01G 3/02 | 30/254 |
| 2014/0053413 A1 * | 2/2014 | Huang | A01G 3/0251 | 30/250 |
| 2014/0182142 A1 * | 7/2014 | Vanttila | A01G 3/02 | 30/271 |
| 2014/0202007 A1 * | 7/2014 | Huang | A01G 3/02 | 30/262 |
| 2015/0321364 A1 * | 11/2015 | Tsai | B26B 13/26 | 30/262 |
| 2017/0049060 A1 * | 2/2017 | Chou | B26B 13/26 | |
| 2017/0105356 A1 * | 4/2017 | Lin | A01G 3/02 | |
| 2017/0215346 A1 * | 8/2017 | Lin | A01G 3/02 | |
| 2017/0332558 A1 * | 11/2017 | Dechant | A01G 3/021 | |
| 2018/0222065 A1 * | 8/2018 | Chen | B26B 13/04 | |

* cited by examiner

HANDHELD GARDENING GEAR SHEARS

BACKGROUND OF THE INVENTION

1. Field of the Invention

The present invention relates to a gardening tool and, more particularly, to a pair of handheld gardening gear shears.

2. Description of the Related Art

Conventional gardening shears comprise two cutting members pivotally connected by a screw and a nut, and two handles mounted on the two cutting members. Each of the two cutting members has a mediate position provided with a through hole to allow passage of the screw. When in use, the two cutting members are pivoted about the screw so that the gardening shears are closed and opened to perform a cutting action so as to shear branches or the like. However, the two cutting members are not operated in an energy-saving manner, so that the user cannot operate the two cutting members to shear the branches conveniently.

Conventional energy-saving gardening shears were disclosed in the Taiwanese Patent Publication No. 382194, and comprise a first module and a second module. The first module includes a first blade handle and a first grip. The first blade handle has a first working portion, a mediate portion and a first pivot portion. The first pivot portion is combined with the first grip. The mediate portion of the first blade handle is provided with a first driving portion which has multiple first toothed grooves and first toothed portions. The second module includes a second blade handle, a rocking arm and a second grip. The second blade handle has a second working portion, a mediate section and a second pivot portion. The mediate section of the second blade handle is pivotally connected with the mediate portion of the first blade handle. The second pivot portion is pivotally connected with the rocking arm. The rocking arm has a first end combined with the second grip and a second end provided with a second driving portion which has multiple second toothed grooves and second toothed portions. The second toothed grooves of the second driving portion mesh with the first toothed portions of the first driving portion, and the second toothed portions of the second driving portion mesh with the first toothed grooves of the first driving portion. However, the first toothed grooves and first toothed portions of the first module and the second toothed grooves and second toothed portions of the second module are disposed at an open state, so that foreign objects easily enter and jam the first module and the second module. In addition, the first module and the second module do not have a reinforced strength, so that when the gardening shears are used to shear a larger branch, the first working portion and the second working portion cannot cut the larger branch easily, thereby decreasing the working efficiency.

BRIEF SUMMARY OF THE INVENTION

In accordance with the present invention, there is provided a pair of gardening shears comprising a first driving arm, a jaw member pivotally connected with the first driving arm by a first bolt, a second driving arm pivotally connected with the first driving arm by a second bolt, a first handle mounted on the first driving arm, a second handle mounted on the second driving arm, and a locking unit mounted on the first handle. The first driving arm is provided with a first shank, a blade, a first shaft hole, a second shaft hole, and an elongate slot. The first shaft hole of the first driving arm is between the first shank and the blade and is pivotally mounted on the first bolt. The second shaft hole of the first driving arm is lower than the first shaft hole and is pivotally mounted on the second bolt. The elongate slot of the first driving arm is adjacent to the first shank. The jaw member is provided with a jaw portion and a linking portion. The linking portion of the jaw member is provided with a first pivot hole pivotally mounted on the first bolt and has a side provided with a first toothed portion. The second driving arm is provided with a second shank and a driving portion. The driving portion of the second driving arm is provided with a second pivot hole pivotally mounted on the second bolt and has a side provided with a second toothed portion meshing with the first toothed portion of the jaw member. The driving portion of the second driving arm has a periphery provided with a locking opening corresponding to the elongate slot of the first driving arm. The first handle is mounted on the first shank of the first driving arm and is provided with a receiving channel aligning with the elongate slot of the first driving arm. The first handle has a front end provided with a reinforcement surrounding the first shaft hole and the second shaft hole of the first driving arm. The reinforcement of the first handle has a side end provided with a recessed portion which has two through holes respectively aligning with the first shaft hole and the second shaft hole of the first driving arm. A substantially 8-shaped reinforcing washer inserted into the recessed portion of the first handle. The second handle is mounted on the second shank of the second driving arm and is provided with a protecting piece surrounding the driving portion of the second driving arm. The protecting piece is lower than the second handle and is received in the reinforcement of the first handle. The locking unit is mounted in the receiving channel of the first handle to position the first driving arm and the second driving arm. Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-6, a pair of gardening shears in accordance with the preferred embodiment of the present invention comprise a first driving arm 10, a jaw member 20 pivotally connected with the first driving arm 10 by a first bolt 23, a second driving arm 30 pivotally connected with the first driving arm 10 by a second bolt 33, a first handle 40 mounted on the first driving arm 10, a second handle 50 mounted on the second driving arm 30, and a locking unit 60 mounted on the first handle 40.

The first driving arm 10 is provided with a first shank 11, a blade 12, a first shaft hole 13, a second shaft hole 14, and an elongate slot 15. The first shaft hole 13 of the first driving arm 10 is between the first shank 11 and the blade 12 and is pivotally mounted on the first bolt 23. The second shaft hole 14 of the first driving arm 10 is lower than the first shaft hole 13 and is pivotally mounted on the second bolt 33. The elongate slot 15 of the first driving arm 10 is adjacent to the first shank 11.

The jaw member 20 is provided with a jaw portion 21 and a linking portion 22. The linking portion 22 of the jaw member 20 is provided with a first pivot hole 221 pivotally mounted on the first bolt 23 and has a side provided with a first toothed portion 24.

The second driving arm 30 is provided with a second shank 31 and a driving portion 32. The driving portion 32 of the second driving arm 30 is provided with a second pivot hole 321 pivotally mounted on the second bolt 33 and has a side provided with a second toothed portion 34 meshing with the first toothed portion 24 of the jaw member 20. The driving portion 32 of the second driving arm 30 has a periphery provided with a locking opening 35 corresponding to the elongate slot 15 of the first driving arm 10.

The first handle 40 is mounted on the first shank 11 of the first driving arm 10 and is provided with a receiving channel 44 aligning with the elongate slot 15 of the first driving arm 10. The first handle 40 has a front end provided with a reinforcement 41 surrounding the first shaft hole 13 and the second shaft hole 14 of the first driving arm 10. The reinforcement 41 of the first handle 40 has a side end provided with a recessed portion 42 which has two through holes 421 respectively aligning with the first shaft hole 13 and the second shaft hole 14 of the first driving arm 10. A substantially 8-shaped reinforcing washer 43 inserted into the recessed portion 42 of the first handle 40.

The second handle 50 is mounted on the second shank 31 of the second driving arm 30 and is provided with a protecting piece 51 surrounding the driving portion 32 of the second driving arm 30. The protecting piece 51 is lower than the second handle 50 and is received in the reinforcement 41 of the first handle 40.

The locking unit 60 is mounted in the receiving channel 44 of the first handle 40 to position the first driving arm 10 and the second driving arm 30.

In the preferred embodiment of the present invention, the gardening shears further comprise an elastic member 52 biased between the first handle 40 and the second handle 50.

In the preferred embodiment of the present invention, the locking unit 60 includes two symmetric adjusting knobs 61 mounted on the first handle 40 and slidable in the receiving channel 44 of the first handle 40 and the elongate slot 15 of the first driving arm 10, a rod 62 mounted between the two adjusting knobs 61, and a locking member 63 mounted on the rod 62 and movable to be inserted into the locking opening 35 of the second driving arm 30. The locking member 63 of the locking unit 60 is disposed outside of the elongate slot 15 of the first driving arm 10 and is moved with the two adjusting knobs 61.

In the preferred embodiment of the present invention, the receiving channel 44 of the first handle 40 has two guide grooves 441 formed on two opposite sides thereof. A shim 45 is mounted in one of the two guide grooves 441 of the first handle 40 and is provided with an aperture 451 aligning with the receiving channel 44 of the first handle 40. The shim 45 is further provided with a positioning rib 452. The two adjusting knobs 61 of the locking unit 60 are mounted in the two guide grooves 441 of the first handle 40 respectively. One of the two adjusting knobs 61 of the locking unit 60 is provided with a first positioning hole 612 and a second positioning hole 613.

In the preferred embodiment of the present invention, each of the two adjusting knobs 61 of the locking unit 60 is provided with a has a shaft portion 611 movable in the receiving channel 44 of the first handle 40 and the elongate slot 15 of the first driving arm 10, and the rod 62 is mounted between the shaft portions 611 of the two adjusting knobs 61.

Figure 1:
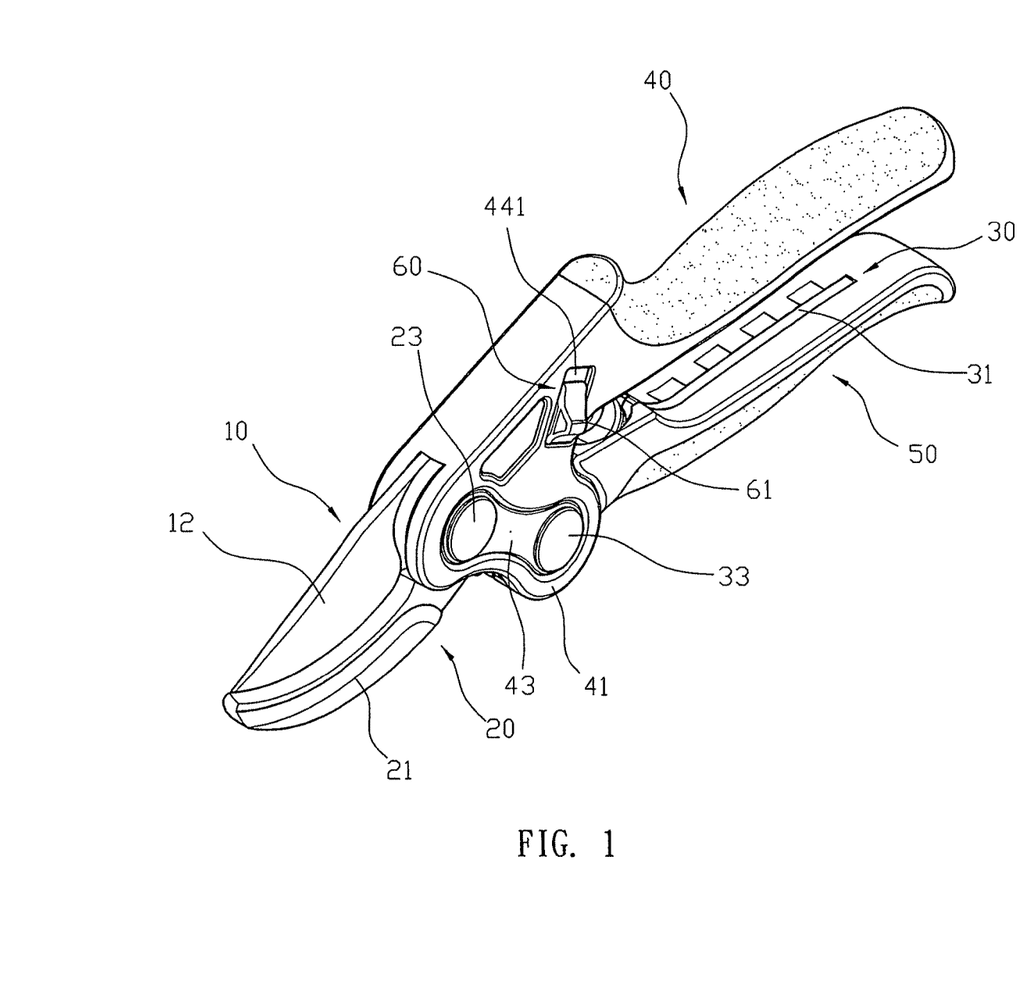
FIG. 1 is a perspective view of a pair of gardening shears in accordance with the preferred embodiment of the present invention.
Figure 2:
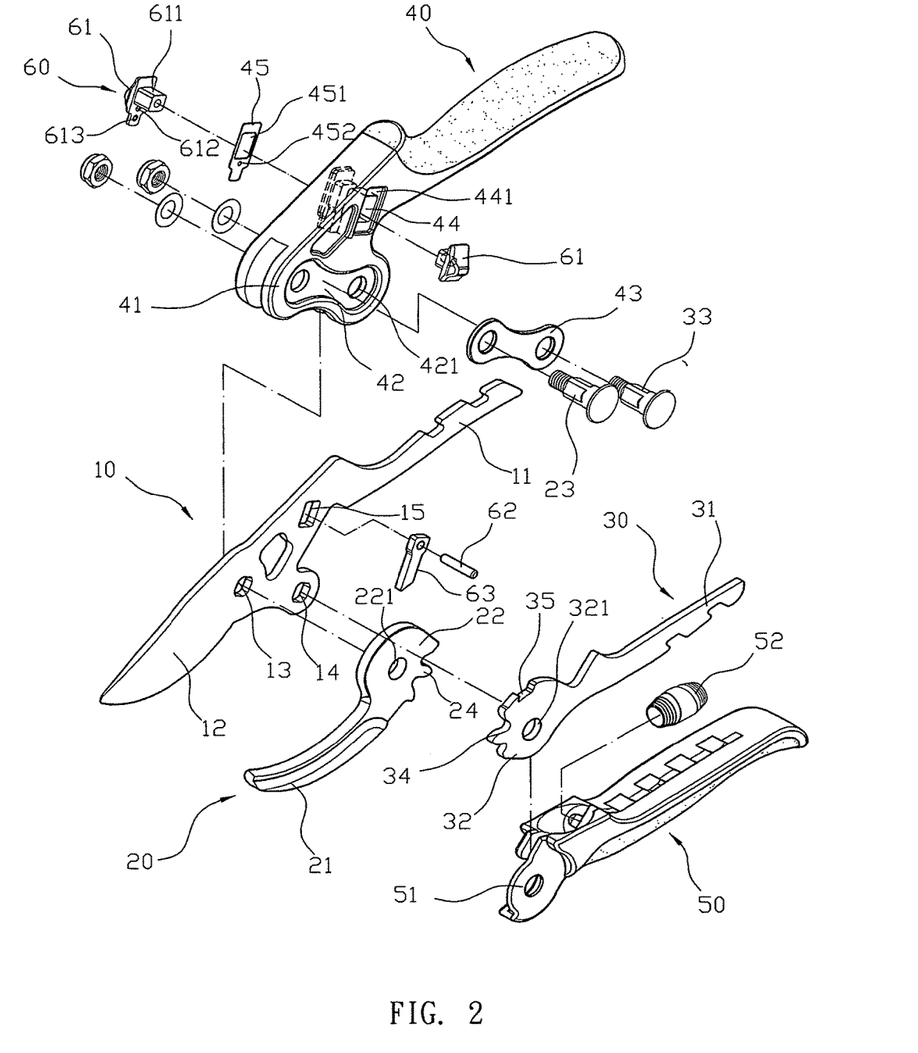
FIG. 2 is an exploded perspective view of the gardening shears as shown in FIG. 1.

In assembly, the first handle 40 is mounted on the first shank 11 of the first driving arm 10, with the reinforcement 41 surrounding the first shaft hole 13 and the second shaft hole 14 of the first driving arm 10. Then, the jaw portion 21 of the jaw member 20 is juxtaposed to the blade 12 of the first driving arm 10, and the first pivot hole 221 of the jaw member 20 aligns with the first shaft hole 13 of the first driving arm 10. Then, the first bolt 23 in turn extends through the reinforcing washer 43, one of the two through holes 421 of the first handle 40, the first pivot hole 221 of the jaw member 20 and the first shaft hole 13 of the first driving arm 10. Then, the second handle 50 is mounted on the second shank 31 of the second driving arm 30, with the protecting piece 51 surrounding the driving portion 32 of the second driving arm 30. Then, the driving portion 32 of the second driving arm 30 is placed into the reinforcement 41 of the first handle 40, with the second pivot hole 321 of the second driving arm 30 aligning with the second shaft hole 14 of the first driving arm 10. At this time, the second toothed portion 34 of the second driving arm 30 meshes with the first toothed portion 24 of the jaw member 20. Then, the second bolt 33 in turn extends through the reinforcing washer 43, the other one of the two through holes 421 of the first handle 40, the second pivot hole 321 of the second driving arm 30 and the second shaft hole 14 of the first driving arm 10. In such a manner, when the second driving arm 30 and the first driving arm 10 are pivoted about the second bolt 33, the second toothed portion 34 of the second driving arm 30 drives the first toothed portion 24 of the jaw member 20, so that the jaw member 20 and the first driving arm 10 are pivoted about the first bolt 23, and the jaw portion 21 of the jaw member 20 is moved relative to the blade 12 of the first driving arm 10. Then, the locking member 63 of the locking unit 60 is sandwiched between the first driving arm 10 and the first handle 40 and disposed outside of the elongate slot 15 of the first driving arm 10. Then, the rod 62 of the locking unit 60 extends through the locking member 63 and the elongate slot 15 of the first driving arm 10. Then, the shaft portion 611 of each of the two adjusting knobs 61 is mounted in the receiving channel 44 of the first handle 40, with the rod 62 being inserted between the shaft portions 611 of the two adjusting knobs 61, and with the locking member 63 being inserted between the shaft portions 611 of the two adjusting knobs 61. Then, the two adjusting knobs 61 of the locking unit 60 are mounted in the two guide grooves 441 of the first handle 40 respectively to finish assembly of the locking unit 60. Thus, the gardening shears are assembled.

Figure 5:
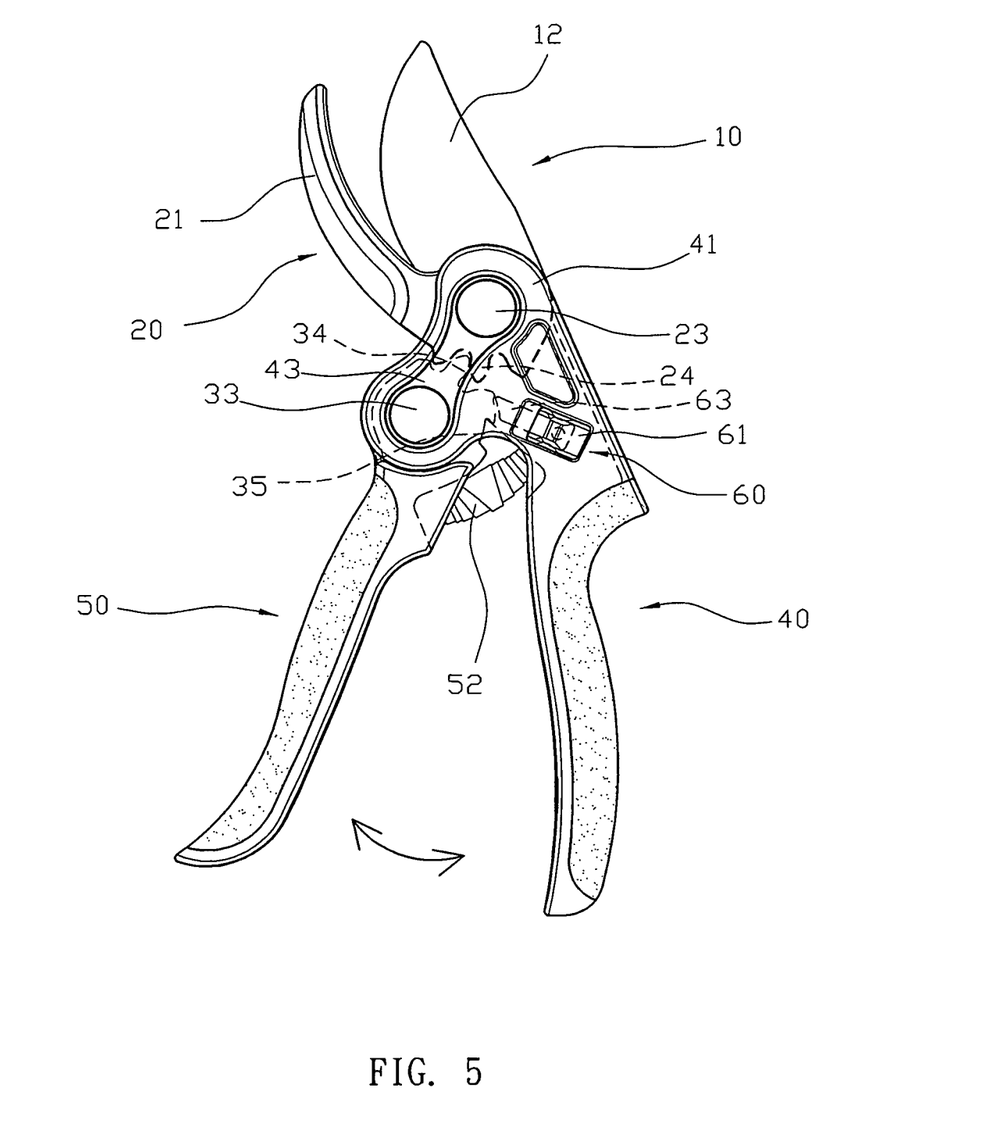
FIG. 5 is a schematic operational view of the gardening shears as shown in FIG. 3.
Figure 6:
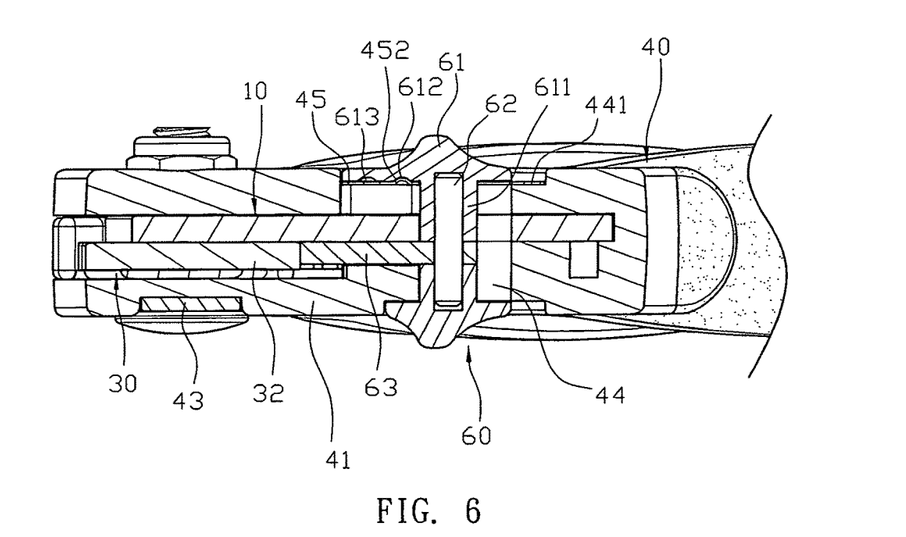
FIG. 6 is a cross-sectional view of the gardening shears taken along line B-B as shown in FIG. 3.
Figure 7:
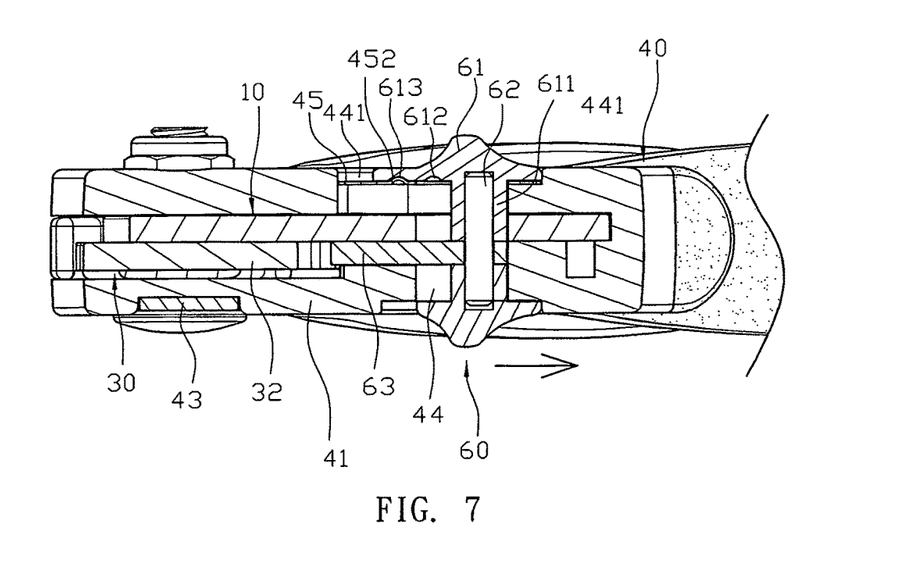
FIG. 7 is a schematic operational view of the gardening shears as shown in FIG. 6.

In operation, referring to FIGS. 5-7 with reference to FIGS. 1-4, when the elastic member 52 pushes the first handle 40 and the second handle 50 outward as shown in FIG. 5, the second driving arm 30 and the first driving arm 10 are pivoted outward about the second bolt 33, and the second toothed portion 34 of the second driving arm 30 drives the first toothed portion 24 of the jaw member 20, so that the jaw member 20 and the first driving arm 10 are pivoted outward about the first bolt 23, and the jaw portion 21 of the jaw member 20 is moved outward relative to the blade 12 of the first driving arm 10.

Figure 3:
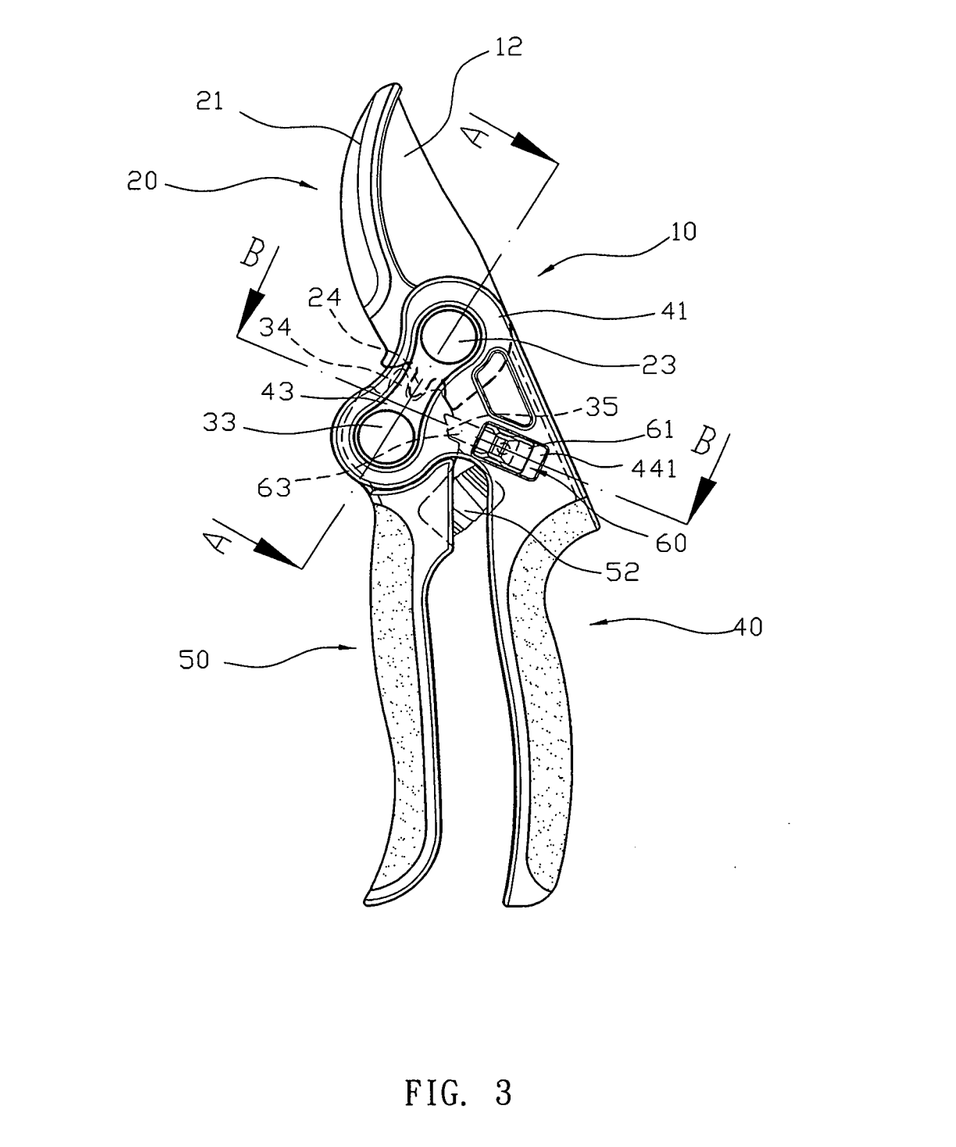
FIG. 3 is a side view of the gardening shears as shown in FIG. 1.
Figure 4:
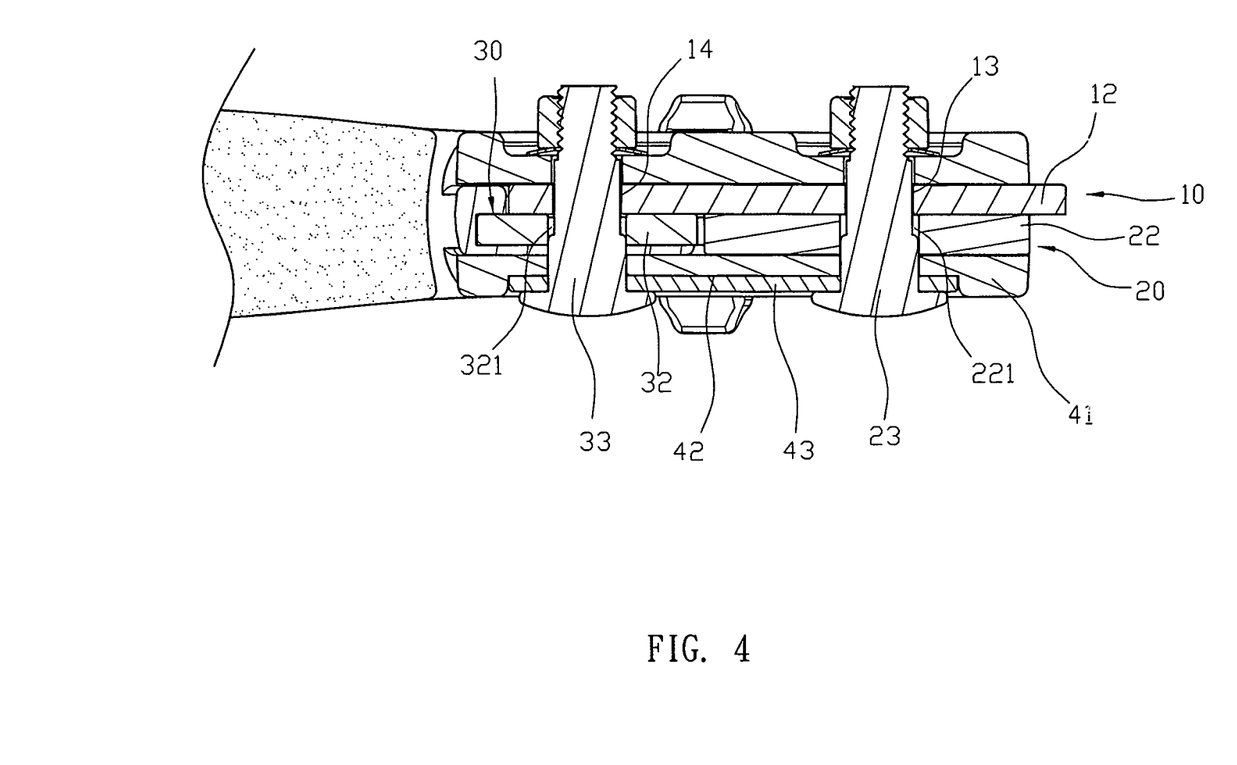
FIG. 4 is a cross-sectional view of the gardening shears taken along line A-A as shown in FIG. 3.

On the contrary, when the first handle 40 and the second handle 50 are pressed by a user to move toward each other, the elastic member 52 is compressed, the second driving arm 30 and the first driving arm 10 are pivoted inward about the second bolt 33, and the second toothed portion 34 of the second driving arm 30 drives the first toothed portion 24 of the jaw member 20, so that the jaw member 20 and the first driving arm 10 are pivoted inward about the first bolt 23, and the jaw portion 21 of the jaw member 20 is moved toward and touches the blade 12 of the first driving arm 10 as shown in FIG. 3 to perform a cutting action.

In such a manner, the second driving arm 30 and the jaw member 20 have different fulcrums so that the first driving arm 10, the jaw member 20 and the second driving arm 30 construct a multi-lever structure to perform the cutting action smoothly in an energy-saving way, thereby enhancing the stability of operation of the gardening shears.

It is appreciated that, when the gardening shears are disposed at the closed state as shown in FIG. 3, the two adjusting knobs 61 of the locking unit 60 are moved in the two guide grooves 441 of the first handle 40 respectively, and the shaft portion 611 of each of the two adjusting knobs 61 is moved in the receiving channel 44 of the first handle 40, so that the rod 62 is moved, and the locking member 63 is moved toward the driving portion 32 of the second driving arm 30 and is inserted into and locked in the locking opening 35 of the second driving arm 30 as shown in FIG. 3, so as to lock the first driving arm 10 and the second driving arm 30. At this time, when the two adjusting knobs 61 of the locking unit 60 are moved relative to the first handle 40, one of the two adjusting knobs 61 of the locking unit 60 is moved relative to the shim 45, so that the first positioning hole 612 is locked onto the positioning rib 452 of the shim 45 as shown in FIG. 6, so as to position the two adjusting knobs 61, and to lock the first driving arm 10 and the second driving arm 30 exactly, thereby preventing the two adjusting knobs 61 from being moving freely or slipping, such that the gardening shears are disposed at the closed state solidly. On the contrary, the two adjusting knobs 61 of the locking unit 60 are moved reversely in the two guide grooves 441 of the first handle 40 respectively, and the shaft portion 611 of each of the two adjusting knobs 61 is moved in the receiving channel 44 of the first handle 40, so that the rod 62 is moved, and the locking member 63 is moved outward to detach from the locking opening 35 of the second driving arm 30, so as to unlock the first driving arm 10 and the second driving arm 30, such that the first driving arm 10 and the second driving arm 30 are pivoted freely and the gardening shears are disposed at the opened state as shown in FIG. 5. At this time, when the two adjusting knobs 61 of the locking unit 60 are moved relative to the first handle 40, one of the two adjusting knobs 61 of the locking unit 60 is moved relative to the shim 45, so that the second positioning hole 613 is locked onto the positioning rib 452 of the shim 45 as shown in FIG. 7, so as to position the two adjusting knobs 61, thereby preventing the two adjusting knobs 61 from being moving freely or slipping during operation of the cutting action.

Accordingly, the jaw member 20 is pivotally connected with the first driving arm 10 by the first bolt 23, and the second driving arm 30 is pivotally connected with the first driving arm 10 by the second bolt 33, so that the jaw member 20 and the second driving arm 30 have different fulcrums to construct a multi-lever structure so as to perform the cutting action smoothly in an energy-saving way. In addition, the second toothed portion 34 of the second driving arm 30 directly drives the first toothed portion 24 of the jaw member 20, to transmit the power from the second driving arm 30 to the jaw member 20 exactly, thereby greatly enhancing the stability of operation of the gardening shears, and thereby facilitating the user performing the cutting action successively. Further, the first handle 40 mounted on the first driving arm 10 to protect the first driving arm 10, and the second handle 50 is mounted on the second driving arm 30 to protect the second driving arm 30. Further, the reinforcement 41 of the first handle 40 surrounds the first shaft hole 13 and the second shaft hole 14 of the first driving arm 10 to reinforce the first driving arm 10. Further, the linking portion 22 of the jaw member 20 and the driving portion 32 of the second driving arm 30 are received in and protected by the reinforcement 41 of the first handle 40, so that the second toothed portion 34 of the second driving arm 30 meshes with the first toothed portion 24 of the jaw member 20 exactly, thereby preventing the second toothed portion 34 of the second driving arm 30 and the first toothed portion 24 of the jaw member 20 from being worn or broken by hitting or jammed due to intrusion of foreign objects, so as to enhance the lifetime of the gardening shears. Further, the reinforcing washer 43 is inserted into the recessed portion 42 of the first handle 40 and allows passage of the first bolt 23 and the second bolt 33, so that the first bolt 23 and the second bolt 33 are restricted mutually by the reinforcing washer 43, to enhance the locking strength and stability. Further, the reinforcing washer 43 reinforces the reinforcement 41 of the first handle 40 to enhance the structural strength and the lifetime of the gardening shears.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A pair of gardening shears comprising:
a first driving arm;
a jaw member pivotally connected with the first driving arm by a first bolt;
a second driving arm pivotally connected with the first driving arm by a second bolt;
a first handle mounted on the first driving arm;
a second handle mounted on the second driving arm; and
a locking unit mounted on the first handle;
wherein:
the first driving arm is provided with a first shank, a blade, a first shaft hole, a second shaft hole, and an elongate slot;
the first shaft hole of the first driving arm is between the first shank and the blade and is pivotally mounted on the first bolt;
the second shaft hole of the first driving arm is lower than the first shaft hole and is pivotally mounted on the second bolt;
the elongate slot of the first driving arm is adjacent to the first shank;
the jaw member is provided with a jaw portion and a linking portion;

the linking portion of the jaw member is provided with a first pivot hole pivotally mounted on the first bolt and has a side provided with a first toothed portion;

the second driving arm is provided with a second shank and a driving portion;

the driving portion of the second driving arm is provided with a second pivot hole pivotally mounted on the second bolt and has a side provided with a second toothed portion meshing with the first toothed portion of the jaw member;

the driving portion of the second driving arm has a periphery provided with a locking opening corresponding to the elongate slot of the first driving arm;

the first handle is mounted on the first shank of the first driving arm and is provided with a receiving channel aligning with the elongate slot of the first driving arm;

the first handle has a front end provided with a reinforcement surrounding the first shaft hole and the second shaft hole of the first driving arm;

the reinforcement of the first handle has a side end provided with a recessed portion which has two through holes respectively aligning with the first shaft hole and the second shaft hole of the first driving arm;

a substantially 8-shaped reinforcing washer inserted into the recessed portion of the first handle;

the second handle is mounted on the second shank of the second driving arm and is provided with a protecting piece surrounding the driving portion of the second driving arm;

the protecting piece is lower than the second handle and is received in the reinforcement of the first handle; and the locking unit is mounted in the receiving channel of the first handle to position the first driving arm and the second driving arm.

2. The gardening shears of claim 1, wherein the gardening shears further comprise an elastic member biased between the first handle and the second handle.

3. The gardening shears of claim 1, wherein:

the locking unit includes:

two symmetric adjusting knobs mounted on the first handle and slidable in the receiving channel of the first handle and the elongate slot of the first driving arm;

a rod mounted between the two adjusting knobs; and a locking member mounted on the rod and movable to be inserted into the locking opening of the second driving arm; and the locking member of the locking unit is disposed outside of the elongate slot of the first driving arm and is moved with the two adjusting knobs.

4. The gardening shears of claim 3, wherein:

the receiving channel of the first handle has two guide grooves formed on two opposite sides thereof;

a shim is mounted in one of the two guide grooves of the first handle and is provided with an aperture aligning with the receiving channel of the first handle;

the shim is further provided with a positioning rib;

the two adjusting knobs of the locking unit are mounted in the two guide grooves of the first handle respectively; and one of the two adjusting knobs of the locking unit is provided with a first positioning hole and a second positioning hole.

5. The gardening shears of claim 3, wherein each of the two adjusting knobs of the locking unit is provided with a has a shaft portion movable in the receiving channel of the first handle and the elongate slot of the first driving arm, and the rod is mounted between the shaft portions of the two adjusting knobs.

6. The gardening shears of claim 4, wherein each of the two adjusting knobs of the locking unit is provided with a has a shaft portion movable in the receiving channel of the first handle and the elongate slot of the first driving arm, and the rod is mounted between the shaft portions of the two adjusting knobs.

* * * * *